(12) United States Patent
Heyse

(10) Patent No.: US 7,926,884 B2
(45) Date of Patent: Apr. 19, 2011

(54) SPOKE, WHEEL AND PROCESS FOR MANUFACTURING A SPOKE, ESPECIALLY FOR BICYCLES

(75) Inventor: Joachim Heyse, Wolfratshausen (DE)

(73) Assignee: DT Swiss Inc., Grand Junction, CO (US)

( * ) Notice: Subject to any disclaimer, the term of this patent is extended or adjusted under 35 U.S.C. 154(b) by 428 days.

(21) Appl. No.: 11/824,483

(22) Filed: Jun. 29, 2007

(65) Prior Publication Data

US 2008/0265659 A1 Oct. 30, 2008

(30) Foreign Application Priority Data

Apr. 24, 2007 (DE) .......................... 10 2007 019 612

(51) Int. Cl.
*B60B 9/26* (2006.01)
*B60B 1/02* (2006.01)
(52) U.S. Cl. .......................................... 301/104; 301/59
(58) Field of Classification Search .................... 301/55, 301/58–59, 64.701–64.703, 104
See application file for complete search history.

(56) References Cited

U.S. PATENT DOCUMENTS

| 444,430 | A | * | 1/1891 | Gedge .............................. 301/55 |
| 6,036,281 | A | | 3/2000 | Campbell |
| 6,520,595 | B1 | * | 2/2003 | Schlanger ....................... 301/59 |
| 6,899,401 | B2 | * | 5/2005 | Schlanger ....................... 301/59 |
| 7,357,459 | B2 | * | 4/2008 | Schlanger ....................... 301/59 |
| 2005/0173971 | A1 | * | 8/2005 | Passarotto et al. ............ 301/104 |
| 2007/0063574 | A1 | | 3/2007 | Mercat et al. |

FOREIGN PATENT DOCUMENTS

| DE | 199 21 578 C1 | 2/2001 |
| DE | 200 22 351 U1 | 8/2001 |
| EP | 1 304 238 A1 | 4/2003 |
| WO | WO 91/13771 | 9/1991 |
| WO | WO 98/57812 | 12/1998 |
| WO | WO 00/35683 | 6/2000 |

* cited by examiner

*Primary Examiner* — Jason R Bellinger
(74) *Attorney, Agent, or Firm* — Greer, Burns & Crain, Ltd.

(57) ABSTRACT

A spoke, in particular for bicycles, having at least a spoke body and spoke ends provided at the spoke body which are provided to be attached to a rim or a hub body, wherein the spoke body consists of a fibrous composite material, the spoke body includes a plurality of fibers which can be spread out fan-like at least at one spoke end as exposed fibers.

13 Claims, 5 Drawing Sheets

SPOKE, WHEEL AND PROCESS FOR MANUFACTURING A SPOKE, ESPECIALLY FOR BICYCLES

BACKGROUND

The invention relates to a spoke and a wheel, and to a method of manufacturing a spoke, in particular for bicycles. Although the invention will be described below with respect to application in a bicycle, it is pointed out that it may be employed with other unicycles or multi-cycles, for example with bicycle trailers, scooters, or wheelchairs.

For high quality bicycle components the weight plays a significant role. To reduce the weight of wheels, rims and spokes of bicycles, bicycle components of fiber-reinforced plastics have become known which while being reduced in total weight achieve a stability comparable to that of wheels with metal rims.

Attaching spokes to the rim is in particular difficult where the rims are of fiber-reinforced plastics since conventional spoke nipples require that a stable support be provided.

Against the background of this prior art it is therefore the object of the present invention to provide a lightweight wheel, and lightweight spokes which exhibit(s) high strength.

Furthermore it is intended to allow a simple way of incorporating the spokes in the rim and in the hub.

SUMMARY

A spoke according to the invention is in particular provided for application in bicycles, comprising at least a spoke body and provided at the spoke body, spoke ends provided to be attached to a rim or a hub body. According to the invention, the spoke body consists at least substantially of a fibrous composite material, comprising a plurality of fibers protruding at least at one spoke end as exposed fibers which can be spread or fanned out.

The spoke according to the invention has considerable advantages. The plurality of fibers oriented along the spoke body achieves a high strength of the inventive spoke. Concurrently the fibers protruding at the spoke end and substantially not connected to one another allow a simple incorporation in the rim or in the hub body. The option of fanning out and the fanned-out incorporation in the rim or in the hub body allows to achieve high strength and good incorporation of said components. A particular reinforcement of the spoke attaching points at the components is not required since the occurring loads are introduced over a large surface due to the fanned-out fibers of the brush-like spoke ends. Thus the invention provides a very lightweight spoke which can be combined with a lightweight rim since separate rim hole reinforcements are not required.

In a preferred specific embodiment of the invention the spoke body comprises a plurality of fibers which are enveloped radially outwardly over the length of the spoke body in at least one cover layer. Such a cover layer allows a high optical spoke surface quality since the fibers positioned in the interior of the spoke are covered by the cover layer.

The cover layer is in particular formed as a fiber arrangement comprising individual fibers aligned in parallel and, by means of an adhesive layer or the like, tightly connected with one another lying adjacent to one another. An alternative option is to use a fabric layer or braided fabric or the like. The use of a fabric arrangement results in a particularly high surface quality since the individual fibers, lying tightly adjacent to one another in one layer, allow an optically particularly attractive surface.

The fibers exposed at least at one end are preferably unconnected.

In all of the embodiments at least one fiber is taken from a group of fibers comprising, synthetic fibers, carbon fibers, aramidic fibers such as Kevlar® fibers, glass fibers, and boron fibers. Other fiber materials are also conceivable. For example metallic fibers and other anorganic or organic fiber materials may be employed as well. It is particularly preferred to use carbon fibers, glass fibers, and/or Kevlar® fibers.

Particularly preferred specific embodiments provide that fibers of two different fiber materials are used, preferably a considerable and in particular the major portion of the fibers consists for example of carbon fibers which have a high tensile strength while a smaller but still considerable portion of the fibers consists for example of aramidic fibers such as Kevlar® fibers which exhibit a higher elongation at break such that, if a spoke should break, it does not abruptly break in two but due to the Kevlar® fibers there is still a persistent connection. Fibers of three or more different fiber materials may be employed as well.

Preferably the cross-section of the spoke body is configured to be symmetrical and in particular aerodynamical. Preferably the cross-section is configured to be elliptical so as to offer a low aerodynamic drag.

In a particularly preferred embodiment the spoke comprises two spoke bodies crossing and connected with each other. The crossing spoke bodies are in particular arranged in the same plane such that despite the crossing spoke bodies both spoke bodies later exhibit a straight, uncurved line in the wheel which increases stability.

In all of the embodiments it is preferred that the fibers are configured as monofilaments. Preferably the spokes are manufactured by employing rovings of unidirectional fibers or monofilaments which allow a high stability of the spoke.

The wheel according to the invention is in particular provided to be used with bicycles and comprises a rim, a hub body, and spokes connecting the rim and the hub body. The spokes consist of at least one spoke body and adjacent spoke ends. At least the spokes of the wheel according to the invention consist of a fibrous composite material. Preferably the rim and/or the hub body consist of a fibrous composite material at least in part.

The spoke bodies in the wheel according to the invention each comprise a plurality of fibers protruding beyond the spoke body at least at one spoke end which in a fanned-out condition are embedded in the rim and/or the hub body.

The inventive wheel also has considerable advantages. The fibers protruding brush-like at the ends of the spoke bodies and being embedded in the rim and/or the hub body in a fanned-out condition, achieve a high resistance to stress and strength of the connection between the spoke and the hub body or the rim. No complicated reinforcement of the spoke attaching points at the rim or the hub body is required since the fanned-out incorporation allows a high resistance to stress of the connection between spoke and rim, or between spoke and hub body.

The fibers used are in particular monofilaments in unidirectional alignment adjacent to one another. In specific embodiments of the wheel according to the invention or the spoke according to the invention, employing a specific proportion of stranded fibers or the like is also preferred.

In this case, the spoke ends are embedded in the rim and/or the hub body not only frictionally but also form-fitting.

Advantageously the rim and preferably the hub body also consist of a fibrous composite material so as to obtain a particularly lightweight wheel.

To enhance the surface quality, the spoke fibers are enveloped along the spoke body in a cover layer which may be configured as a fiber arrangement or a fabric layer or braiding or the like.

The wheel according to the invention may comprise radially oriented spokes or else crossed spokes. In the case of crossed spokes, the two spoke bodies cross each other at a crossing angle. Preferably the crossing spoke bodies lie in one plane such that the crossing spoke bodies do not require any bending.

Advantageously the wheel according to the invention is configured to be unitary and preferably integral such that the rim, the spoke, and the hub body together form a uniform, connected element.

The inventive method of manufacturing a spoke provides that a covering layer each is placed in a first mold half provided with a hollow and in a second mold half provided with a hollow, onto which a quantity of fibers in unidirectional alignment is placed such that both hollows are filled up. The fibers are either impregnated with resin in the mold half or the fibers are realized as prepregs. Thereafter the two mold halves are connected with one another such that the respective hollows abut one another. A plurality of fibers protrude from the axial ends of the spoke bodies which are exposed and can be spread out fan-like.

Preferably the exposed, unconnected fiber ends protrude beyond the mold halves.

In all of the configurations it is preferred that the mold halves are firstly coated with a release agent to prevent the fibrous composite material from adhering to the mold halves.

The cover layer employed is preferably a fiber arrangement or a fiber fabric and the fibers used are in particular monofilaments; e.g. in the form of a roving.

Other advantages and possibilities of application of the present invention can be taken from the exemplary embodiment which will now be explained with reference to the accompanying figures.

DETAILED DESCRIPTION

An exemplary embodiment of the present invention will now be described with reference to the accompanying Figures.

Figure 1:
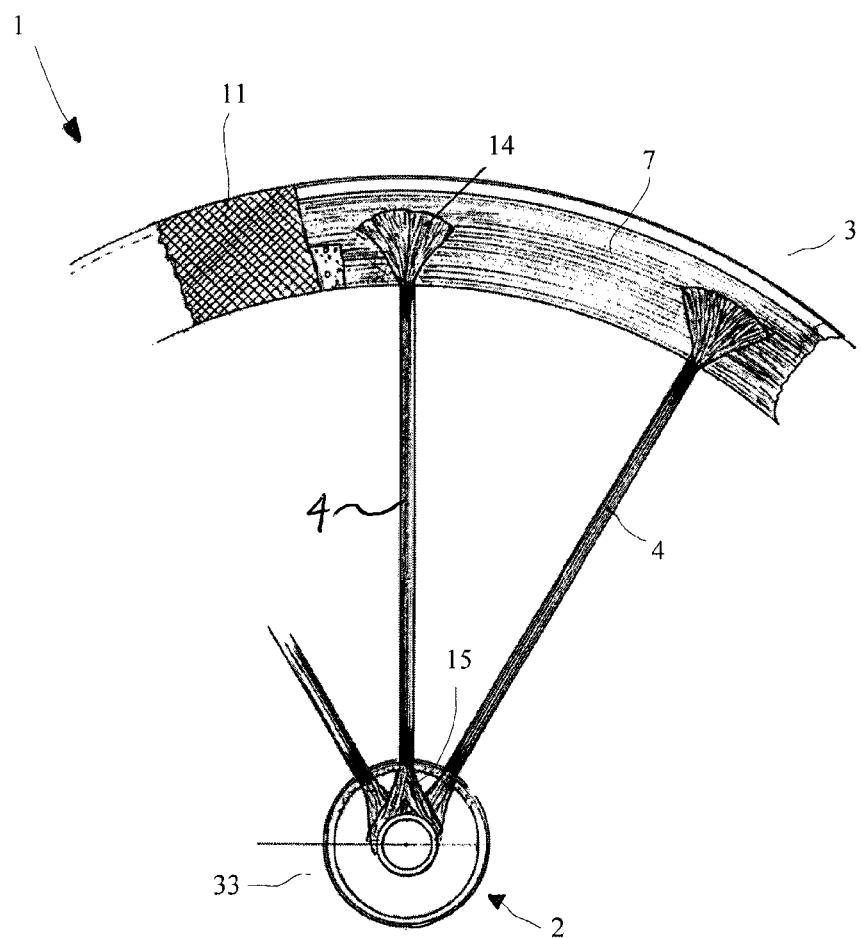
FIG. 1 a side view of a sectional detail of a wheel exhibiting radial spoke orientation.
Figure 2:
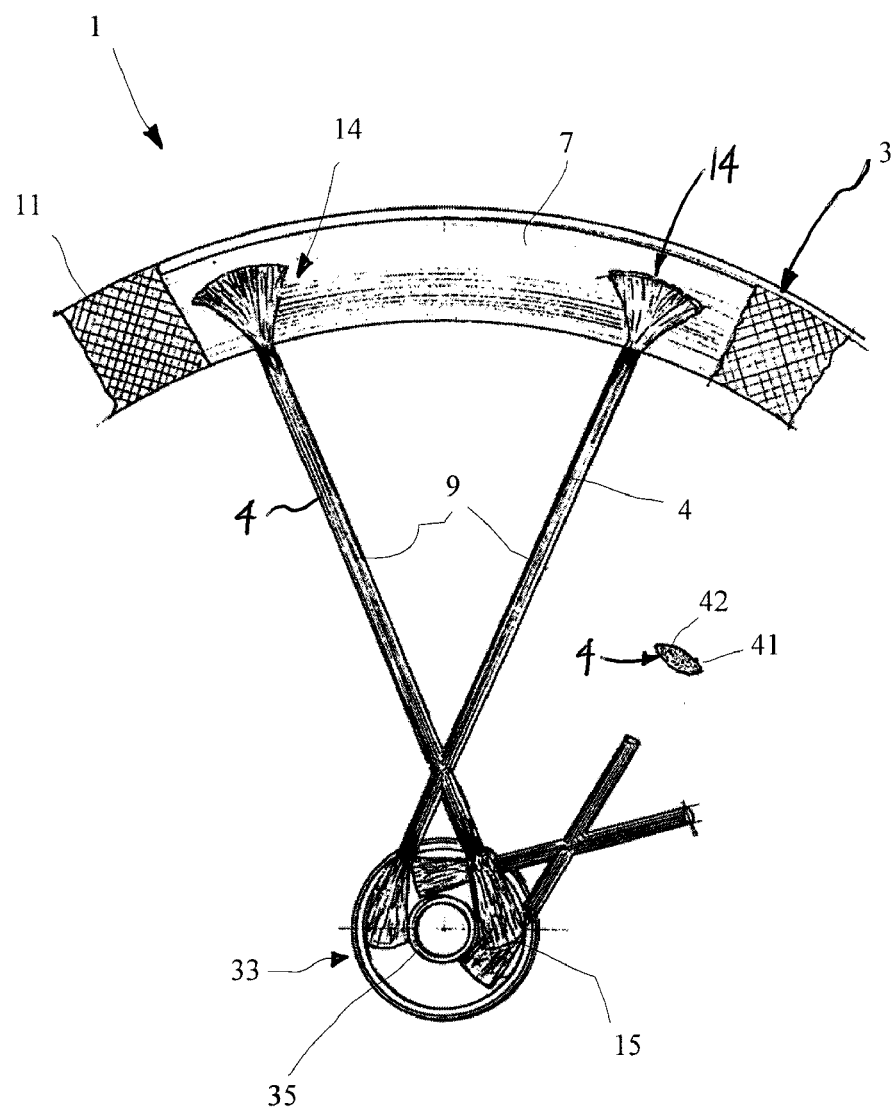
FIG. 2 a sectional detail of a side view of a wheel with crossed spokes.
Figure 3:
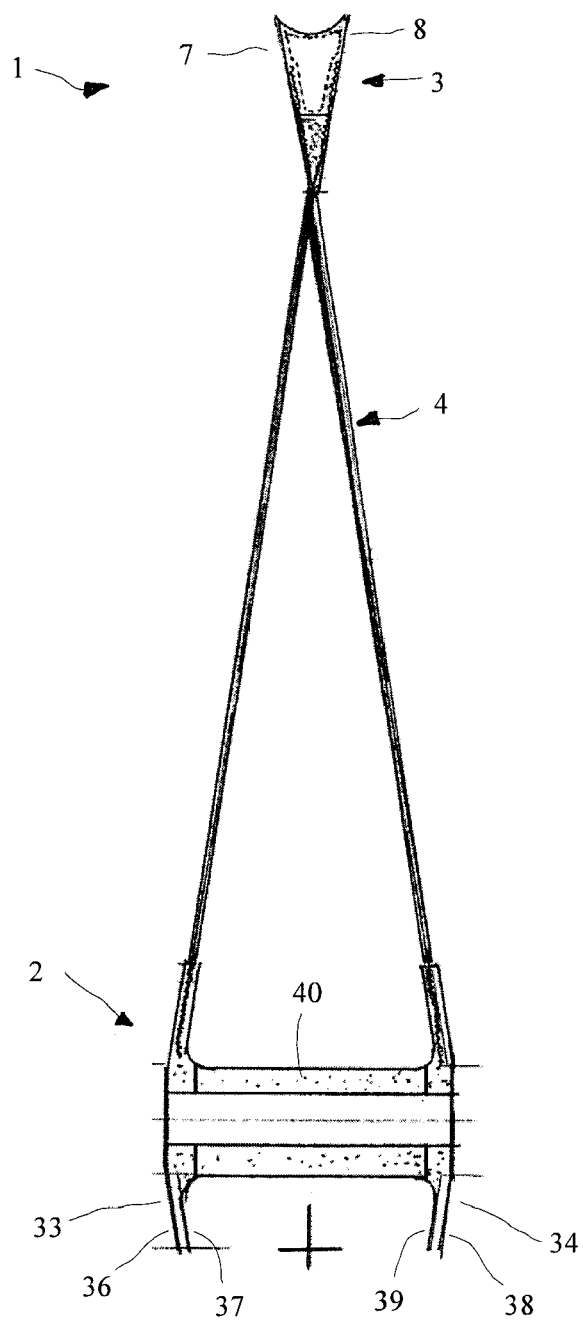
FIG. 3 a cross-sectional view of a wheel according to the invention.

For manufacturing the wheel 1, firstly the spokes 4 are manufactured which according to the illustration in FIG. 1 may comprise a single body 9 as it is provided for radial spoking, or which may comprise two crossed spoke bodies 9 as illustrated in FIG. 2.

For manufacturing the spokes 4 illustrated in FIG. 1, a cover layer 41, in the present exemplary embodiment configured as a one-layer arrangement, is placed into a first mold half 46 after providing the mold half 46 with a release agent to avoid adherence of the finished spokes 4. Thereafter, a plurality of parallel unidirectional fibers 42 is placed on the cover layer 41 to receive the spoke tension. Care is taken that the hollow 47 of the mold half 46 be entirely filled or that the fibers placed inside exceed the available cross-sectional area.

A cover layer 41 as well as a corresponding plurality of fibers 42 is also placed in a second mold half.

The length of the mold half 46 corresponds to the spoke length between the hub body 2 and the rim 3. The length of the fibers placed in the mold half 46 is longer than the length of the mold half 46, such that the individual fibers 41 protrude beyond the ends of the mold half 46, preferably between approximately one and three centimeters, preferably approximately 2 centimeters.

The protruding fibers 42 can thus be fanned out as the spoke is manufactured or as the spoke is incorporated into the rim 3 or the hub body 2. By means of the spoke 4 it is thus possible to guarantee a secure and firm seat in the rim or in the hub body without having to incorporate complicated reinforcement layers or the like into the structural elements to guarantee the required hold.

The spokes 4 are prefabricated separately and cured separately, allowing stocking for wheel production.

For manufacturing the spokes and for manufacturing the rims 3 or the entire wheel 1 it is generally possible to use pre-impregnated fiber fabric but it is also possible and preferred to use dry fibers or fiber fabric which are subsequently impregnated with a resin during manufacture.

Figure 4:
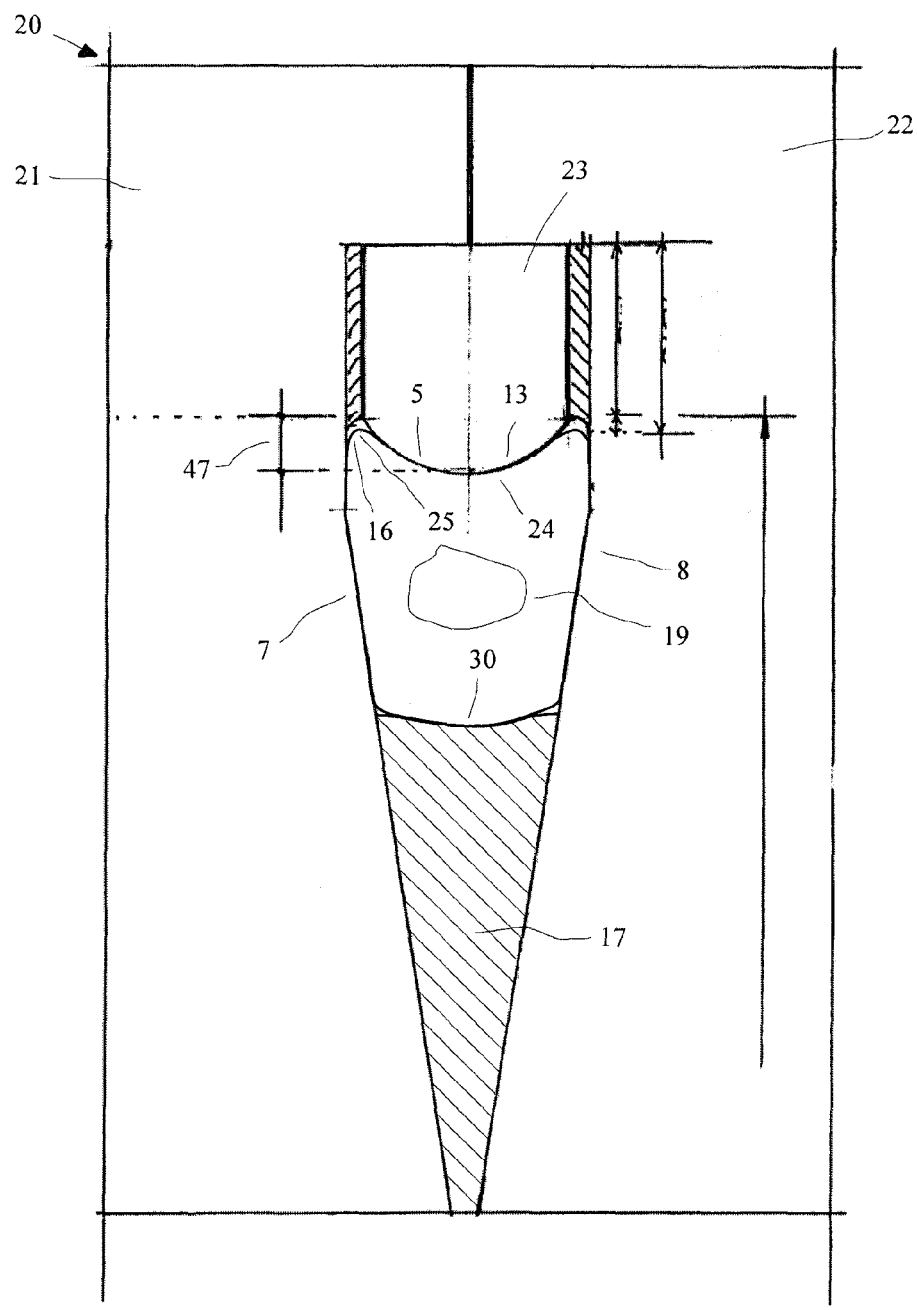
FIG. 4 a cross-section of the manufacturing mold and the rim according to FIG. 3.

For manufacturing the wheel 1, a section of which is illustrated in FIG. 1, a mold 20 comprising mold parts 21 and 22 is used (see FIG. 4).

The mold part 21, placed level on a support, is coated with a release agent as is the mold part 22. Thereafter, a fabric section 11 is placed in a circle on the mold part 21 along the periphery of the rim 3 to be manufactured such that the fabric section 11 will form the rim flange 7 in the later rim 3. Similarly, a fabric section 12 which will form the rim flange 8 is placed into the mold part 22 of the manufacturing mold 20.

Figure 5:
FIG. 5 a schematic view of a fabric tube.
Figure 6:
FIG. 6 a schematic view of a folded over fabric strip.
Figure 7:
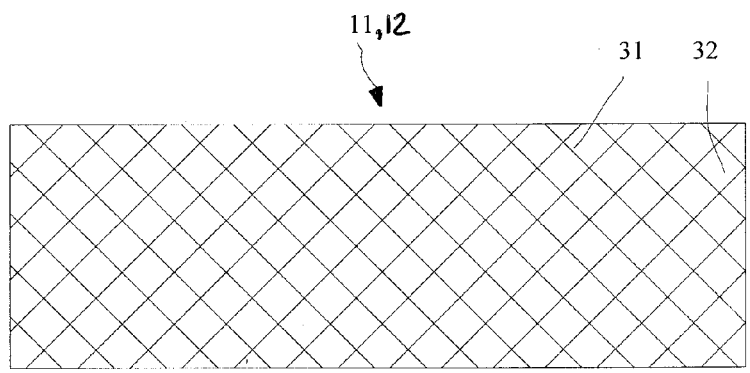
FIG. 7 a top view of a fabric section.
Figure 8:
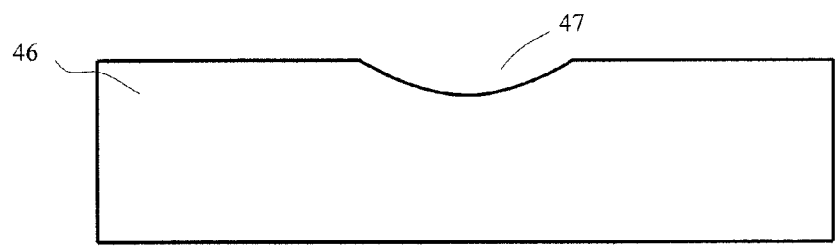
FIG. 8 a schematic view of a mold half for manufacturing the spokes.

The fabric sections 11 and 12 employed may be the fabric sections illustrated in the FIGS. 5 and 6. Preferably the fabric section illustrated in FIG. 5 is used which is configured as a fabric tube 26. Alternatively, the fabric section is a folded over fabric strip 27 shown in FIG. 6. The fabric tube 26 comprises fibers 31 and 32 as illustrated in FIG. 7, all of which are oriented approximately at an angle of 45.degree. to the longitudinal direction of the fabric section.

By using a fabric tube 26 comprising fibers 31 and 32 arranged at angles, superior draping properties of the fabric section 11 are achieved such that the fabric section 11 can be excellently placed in the mold 21 while also retaining the fabric quality over the circumference and across the radial direction of the rim flange 7 in a consistent, homogeneous quality.

In this way a high degree of quality in manufacturing the rim and the wheel is achieved. In the prior art in contrast to this, strips placed on top tend to crease at the radially inwardly or at the radially outwardly places of the rim. Concurrently the mesh distance and the mesh width varies such that no homogeneous properties of the rim and the wheel are achieved.

After placing the fabric section 11, the ends 14 of the spokes 4 assigned to the rim flange 8 are placed onto the fabric section 11, wherein the protruding fibers 42 are fanned out to guarantee as large a hold in the rim as possible. It is also possible that the fibers 42 had already been fanned out in manufacturing the spoke 4 and cured flat in a fanned out condition such that the fanned out and cured spoke is placed on the fabric section 11 which is placed on the mold part 21.

In the radially inwardly region there has been centered relative to the mold part 21 a hub body holder 35 onto which the first outer hub cover 36, the first inner hub cover 37 and thereafter the second inner hub cover 38 and the second outer hub cover 39 are slipped. In the radially inwardly region between the second outer hub cover 39 and the second inner hub cover 38 the fibers 42 protruding at the inwardly spoke end 15 are fanned out and positioned between the covers 38 and 39. After adding a bonding agent which may for example be a resin, the covers 38 and 39 are pressed upon each other and bonded to form a second hub cover 34. The first outer hub and inner hub covers 36 and 37 are later worked in analogy thereto.

A core 17 is placed on the spoke ends 14 which are positioned on the fabric section 11, being approximately triangular in cross-section and provided to be positioned in the area of the rim base.

A mold ring 23, whose radially inwardly surface 24 is matched to the desired rim well profile is covered with a fabric strip at least on the inwardly surface 24. As an alternative or supplement thereto, a fabric tube may be placed on the inwardly surface 24 of the mold ring 23. Thereafter the mold ring 23 is placed in the mold part 21 such that a radial distance or gap remains between the core 17 and the mold ring 23.

An inflatable tube 19 enveloped in a fabric section 16 is inserted into the remaining gap. The fabric section 16 enveloping the inflatable tube may for example be configured as a fabric tube 25 which is mounted onto the inflatable tube 19.

Alternatively the inflatable tube may be enveloped or wrapped in a fabric strip or the like before the inflatable tube 19 is placed into the gap.

The fabric section 16 reinforces the rim well in the radially outwardly area and on the sides, the rim flanges 7 and 8, which also comprise the brake-contact surfaces 47. In the radially inwardly area the fabric section 16 reinforces the rim 3 with a transverse web 30 such that the rim 3 is better suited for absorbing the loads occurring in braking.

After inserting the inflatable tube 19 the mold part 22 is placed onto the mold part 21 and the entire mold 20 is closed. After raising the pressure in the inflatable tube 19 the manufacturing mold 20 is brought up to a higher temperature level to accelerate the curing process.

At the same time or prior to this, the inflatable tube 19 is pressurized to effect a pressure bonding of the individual fabric sections.

After curing and cooling of the manufacturing mold 20 the manufacturing mold 20 is opened and the wheel removed.

It is a significant advantage of the wheel 1 that it consists uniformly of the same or at least a similar material such that the rim, the spokes, and the hub body exhibit the same coefficient of thermal expansion. In conventional wheels of fibrous composite materials having metal spokes, the spoke tension may slacken as the wheel heats up since metal spokes and fibrous composite materials differ in performance. Fibrous composite materials may exhibit negative coefficients of thermal expansion which can further intensify a reduction of spoke tension. The wheel 1 does not exhibit these disadvantages.

Compared to the known three-spoke wheels of fibrous composite material the significant advantage of a much higher lateral rigidity is achieved.

The spokes are tensioned by inserting a hub sleeve 40 between the hub covers 33 and 34. The hub sleeve 40 is bonded with the hub covers 33 and 34 such that on the whole an integral wheel 1 is present which consists of fibrous composite material.

It is a significant advantage of the wheel that the spokes 4 run in a straight line from their origin in the rim until and into the hub cover or the hub flange. This is achieved in that the rim is substantially triangular in cross-section with the inclination angle set so as to obtain a straight-lined form.

The exemplary embodiment of a wheel 1 illustrated in FIG. 2 shows crossed spokes 4, wherein each spoke 4 comprises two crossed spoke bodies 9 lying on a plane and integrally connected with one another. Manufacture is performed using a mold into which crossed fiber bundles and fiber arrangement are inserted to integrally manufacture the crossed spokes. At the four ends of the spoke bodies 9, the individual fibers 42 protrude from the spoke bodies 9 to be integrated into the rim or into the hub body to be form-fitting.

FIG. 2 also illustrates a cross-section of the spoke body 9 which in this exemplary embodiment is approximately elliptical to achieve a low drag.

The invention claimed is:

1. A spoke for a wheel having a rim and a hub body, the wheel comprising:
   a spoke body and spoke ends provided at said spoke body which are attached to the rim and the hub body, wherein said spoke body consists of a fibrous composite material, said spoke body including a plurality of fibers spread out in a fan-like configuration at each spoke end as exposed fibers for being directly connected in said fan-like configuration at one spoke end with the rim and at the other spoke end with the hub body, at least a portion of said exposed fibers in said fan-like configuration at the hub body overlapping at adjacent spoke ends, said exposed fibers, the rim and the hub body being cured together to respectively embed said exposed fibers into the rim and the hub body.

2. The spoke according to claim 1, wherein the plurality of fibers are surrounded by a cover layer over the length of the spoke body.

3. The spoke according to claim 1, wherein the exposed fibers include free ends.

4. The spoke according to claim 1, wherein at least one fiber is taken from a group of fibers comprising carbon fibers, carbon fibers, aramidic fibers, glass fibers, and boron fibers.

5. The spoke according to claim 4, wherein fibers of at least two different fiber materials are provided.

6. The spoke according to claim 1, wherein some of the fibers consist of aramidic fibers.

7. The spoke according to claim 1, wherein a cross-section of the spoke body is elliptical.

8. The spoke according to claim 1, wherein the fibers are configured as monofilaments.

9. A wheel for a bicycle, the wheel having a rim and a hub body and spokes connecting the rim and the hub body, wherein the spokes consist of at least one spoke body and adjacent spoke ends and wherein the spokes consist of a fibrous composite material, the spoke bodies including a plurality of fibers at each of the spoke ends which are embedded in the rim at one of the spoke ends and the hub body at another of the spoke ends in a fanned-out condition, at least a portion of said fanned-out fibers in the hub body overlapping at adjacent spoke ends.

10. The wheel according to claim 9, wherein at least one of the rim and the hub body consist of a fibrous composite material and wherein the fibers fanned out at the spoke ends are embedded in the rim and in the hub body.

11. The wheel according to claim 9, wherein the spokes are surrounded over their length by a cover layer on the longitudinal sides of the spoke bodies.

12. The wheel according to claim 9, wherein pairs of spoke bodies cross one another at a crossing angle.

13. The wheel according to claim 12, wherein the crossing spoke bodies lie in one plane and are manufactured integrally.

* * * * *